United States Patent
Woo (10) Patent No.: US 7,248,837 B2
(45) Date of Patent: Jul. 24, 2007

(54) METHOD AND APPARATUS FOR CONTROLLING POWER OF RADIO LINKS

(75) Inventor: Kyoung-Ho Woo, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 539 days.

(21) Appl. No.: 10/734,626

(22) Filed: Dec. 15, 2003

(65) Prior Publication Data

US 2004/0136330 A1  Jul. 15, 2004

(30) Foreign Application Priority Data

Dec. 30, 2002  (KR) ............... 10-2002-0086823

(51) Int. Cl.
  *H04B 1/00*  (2006.01)
  *H04B 7/00*  (2006.01)
(52) U.S. Cl. ............ 455/69; 455/522; 455/67.11; 455/343.1; 455/67.13; 455/450; 455/126; 455/127.1; 370/332; 370/335; 370/342; 340/870.02
(58) Field of Classification Search ............ 455/69, 455/522, 343.1, 442, 436, 437, 450, 452.1, 455/127.1, 126, 127.2; 370/318
See application file for complete search history.

(56) References Cited

U.S. PATENT DOCUMENTS

| | | | | |
|---|---|---|---|---|
| 6,144,861 A | * | 11/2000 | Sundelin et al. | 455/522 |
| 6,269,239 B1 | * | 7/2001 | Hashem et al. | 455/69 |
| 6,285,887 B1 | * | 9/2001 | Mimura | 455/522 |
| 6,330,456 B1 | * | 12/2001 | Hashem et al. | 455/522 |
| 6,334,047 B1 | * | 12/2001 | Andersson et al. | 455/69 |
| 6,415,137 B1 | * | 7/2002 | Hayashi | 455/70 |
| 6,445,917 B1 | * | 9/2002 | Bark et al. | 455/423 |
| 6,456,826 B1 | * | 9/2002 | Toskala et al. | 455/63.1 |
| 6,473,624 B1 | * | 10/2002 | Corbett et al. | 455/522 |
| 6,493,564 B2 | * | 12/2002 | Longoni et al. | 455/522 |
| 6,553,016 B1 | * | 4/2003 | Roxbergh | 370/331 |
| 6,594,499 B1 | * | 7/2003 | Andersson et al. | 455/522 |

(Continued)

FOREIGN PATENT DOCUMENTS

CN  1330814  1/2002

(Continued)

OTHER PUBLICATIONS

Chinese Office Action Dated Sep. 23, 2005.

(Continued)

*Primary Examiner*—Marceau Milord
(74) *Attorney, Agent, or Firm*—Ked & Associates, LLP (57) ABSTRACT

A method is provided for controlling power of radio links, particularly a method for controlling transmit power of a terminal in soft handover. This may include a process for setting transmit power control commands from each radio link according to quality of each radio link, and a process for setting a combined transmit power control command by confirming whether the transmit power control commands from each radio link are identical for all the radio links. The method for controlling power of the radio links may prevent reduction of reliability of the transmit power control commands in the process for deciding the transmit power control commands from different radio link sets to control the transmit power of the terminal in soft handover.

24 Claims, 4 Drawing Sheets

U.S. PATENT DOCUMENTS

| | | | |
|---|---|---|---|
| 6,628,924 B1 * | 9/2003 | Miyamoto | 455/69 |
| 6,650,905 B1 * | 11/2003 | Toskala et al. | 455/522 |
| 6,671,512 B2 * | 12/2003 | Laakso | 455/453 |
| 6,717,931 B2 * | 4/2004 | Wang et al. | 370/335 |
| 6,760,596 B1 * | 7/2004 | Fiorini et al. | 455/522 |
| 6,760,598 B1 * | 7/2004 | Kurjenniemi | 455/522 |
| 6,823,193 B1 * | 11/2004 | Persson et al. | 455/522 |
| 6,847,828 B2 * | 1/2005 | Miyoshi et al. | 455/522 |
| 6,850,770 B2 * | 2/2005 | Hwang | 455/522 |
| 6,983,165 B1 * | 1/2006 | Hiramatsu | 455/522 |
| 7,010,318 B2 * | 3/2006 | Chang et al. | 455/522 |
| 7,024,203 B1 * | 4/2006 | Naghian | 455/453 |
| 2002/0082038 A1 | 6/2002 | Mochizuki | |

FOREIGN PATENT DOCUMENTS

| | | |
|---|---|---|
| EP | 5469471 A | 11/1995 |
| EP | 0 987 833 | 3/2000 |
| JP | 2001-094508 | 4/2001 |
| JP | 2001-285089 | 10/2001 |
| JP | 2002-533009 | 10/2002 |
| KR | 1020020068701 | 8/2002 |
| KR | 1020030040861 | 5/2003 |
| WO | WO 01/67638 | 9/2001 |

OTHER PUBLICATIONS

Japanese Office Action dated Apr. 5, 2006.

ETSI TS 125 214; Universal Mobile Telecommunications System; Physical layer procedures; vol. 3-R1; No. V370; Jun. 2001; XP014008396.

European Search Report dated Nov. 14, 2006.

* cited by examiner

METHOD AND APPARATUS FOR CONTROLLING POWER OF RADIO LINKS

This application claims priority from Korean Patent Application No. 86823/2002, filed Dec. 30, 2002, the subject matter of which is incorporated herein by reference.

BACKGROUND OF THE INVENTION

1. Field of the Invention

Embodiments of the present invention may relate to a method for controlling power of radio links. More particularly, embodiments of the present invention may relate to a method for efficiently deciding and combining transmit power control (TPC) commands from different radio links.

2. Background of Related Art

A Universal Mobile Terrestrial System (UMTS) is a third generation mobile communication system (IMT-2000) developed from a global system for mobile communications (GSM). The UMTS is intended to provide more improved mobile communication services on the basis of a GSM core network and Wideband Code Division Multiple Access (WCDMA). In December, 1998, the ETSI in Europe, the ARIB/TTC in Japan, the TI in the USA and the TTA in Korea organized the third generation partnership project (3GPP), and attempted to make detailed specifications of the UMTS.

For the fast and efficient technical developments of the UMTS, the 3GPP divides the standardization works of the UMTS into five technical specification groups (TSG) in consideration of network components and operation independency of the components. Each of the TSG develops, approves and manages specifications in the related areas. The TSG for the radio access network (TSG-RAN) develops the specification of functions, requirements and interfaces of a Universal Mobile Telecommunications Network Terrestrial Radio Access Network (UTRAN), which is a new RAN for supporting the WCDMA in the UMTS.

The TSG-RAN is composed of a plenary group and four working groups. A first working group WG1 relates to the specification of a physical layer (first layer), and a second working group WG2 relates to functions of a data link layer (second layer) and a network layer (third layer). A third working group relates to interfaces between a base station, a radio network controller (RNC) and a core network in the UTRAN. A fourth working group relates to requirements for radio link performance and items for managing radio resources.

Figure 1:
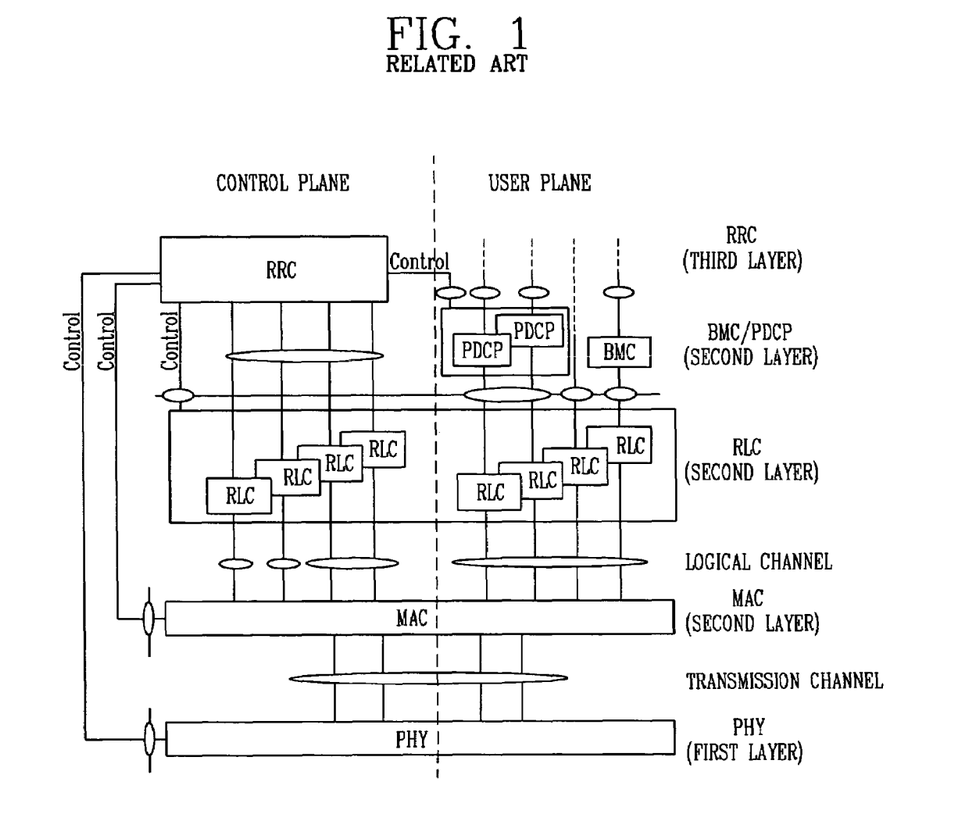
FIG. 1 is a structure diagram illustrating a radio access protocol between a terminal (operated based on the 3GPP RAN specification) and a UTRAN.

FIG. 1 is a structure diagram illustrating a radio access protocol between a terminal (operated based on the 3GPP RAN specification) and a UTRAN. As shown in FIG. 1, the radio access interface protocol includes a physical layer (PHY), a data link layer and a network layer, and is divided into a control plane for transmitting a control signal and a user plane for transmitting data information. The user plane is an area for transmitting traffic information of a user such as voice or IP packets, and the control plane is an area for transmitting control information for maintaining a network interface or call. The plane may be divided into the user plane and the control plane to efficiently manage various traffics.

The protocol layer can be divided into a first layer Layer 1, a second layer Layer 2 and a third layer Layer 3 on the basis of three lower layers of an open system interconnection (OSI) standard model that is well known in the art of communication systems.

In the three layers, the first layer is operated as a physical layer for radio interface, and is connected to a medium access control (MAC) layer through at least one transmission channel. The first layer (or physical layer) performs coding, modulation, spreading and interleaving processes, and transmits or receives a primitive to be easily processed in the upper layer. The primitive used to display mutual interactions implies software type parameter transmission.

The primitive between the physical layer and the MAC layer is divided into a request primitive and an indication primitive. In general, 'Request' is a primitive transmitted from the upper layer to the lower layer, and 'Indication' is a primitive transmitted from the lower layer to the upper layer.

The primitive transmitted from the physical layer to the MAC layer is divided into forward channel information and backward channel information according to its channel information. A forward channel is an information channel transmitted from a base station to a terminal and is the channel that first receives information among the physical layers, and transmits the information to the upper layers. A backward channel is an information channel transmitted from the terminal to the base station.

Figure 2:
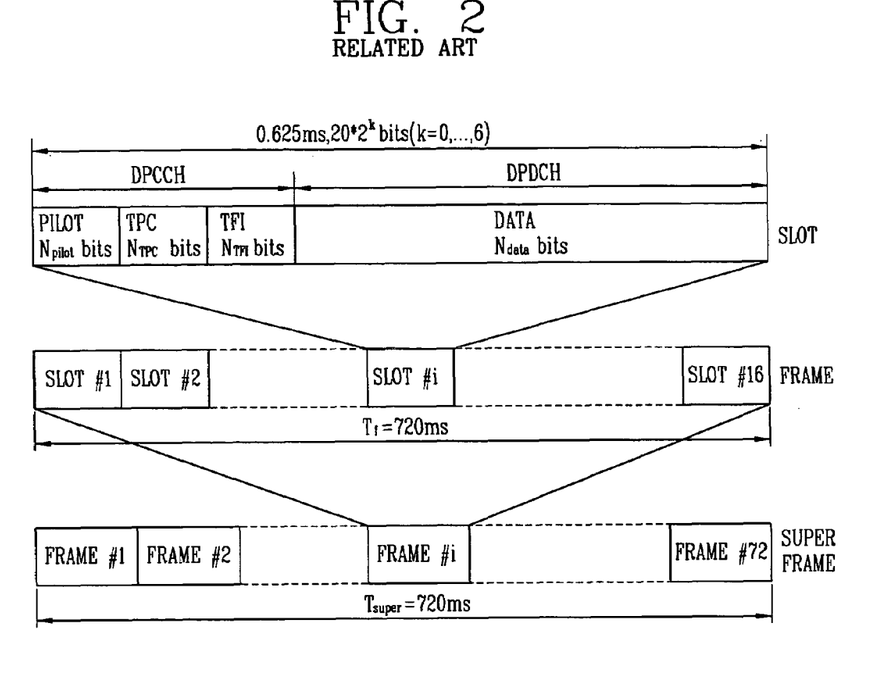
FIG. 2 is a structure diagram illustrating a downlink DPCH frame.

FIG. 2 is a structure diagram illustrating a downlink dedicated physical channel (DPCH) frame. A dedicated channel and a common channel can be distinguished by whether only one subscriber can use one resource at a given point of time. For example, the channel used in a traffic status is regarded as the dedicated channel.

The DPCH is one of the information channels and will now be explained with reference to FIG. 2. The DPCH is divided into a dedicated physical control channel (DPCCH) and a dedicated physical data channel (DPDCH). The DPCCH is a channel for transmitting control information generated in the first layer, and the DPDCH is a channel for transmitting data information of the user. The two channels are time-multiplexed in one physical channel. An uplink DPCCH and an uplink DPDCH serve to carry a dedicated channel transmission channel.

On the other hand, a TPC command is one of the fields of the DPCCH and that experiences the same downlink channel as a common pilot channel (CPICH). Accordingly, if quality of the CPICH is deteriorated, then quality of the DPCCH is also reduced. As a result, reliability of the demodulated TPC command decreases. If the less reliable TPC command is used, then uplink power control may be badly performed. This may have detrimental effects.

In this regard, the 3GPP TS 25.214 V3.7.0(2001-06) 5.1 describes uplink power control for controlling the transmit power of the terminal. In 5.1.2.2.2 and 5.1.2.2.3, the uplink power control for controlling the transmit power of the terminal is divided into algorithm 1 and algorithm 2. Here, the specification suggests conditions that must be satisfied according to a method for combining TPC commands from radio links of different radio link sets in a process for performing uplink power control in soft handover. The contents relating to combination of the TPC commands from the radio links of the different radio link sets are suggested in the 3GPP TS 25.214 V3.7.0(2001-06) 5.1.2.2.2.3 and are summarized as follows.

The terminal must perform soft symbol decision $W_i$ on power control commands $TPC_i$ from each radio link ($i=1, 2, \ldots, N$, where N is a number of the TPC commands from radio links of different radio link sets). That is, the terminal must decide TPC_cmd, which is a combined TPC command, as represented by the following γ function:

$$TPC\_cmd = \gamma(W_1, W_2, \ldots, W_N)$$

Here, TPC_cmd has a value of 1 or −1.

The γ function must satisfy the following conditions. When the TPC commands from the whole radio link sets have a reliable value of 1, then the output of the γ function becomes 1. When the TPC command from any of the radio link sets has a reliable value of 0, then the output of the γ function becomes −1.

As described above, the method for combining the TPC commands from each radio link in the process for performing the uplink power control in the soft handover is described in the specification. However, this specification only suggests the conditions that must be satisfied for the γ function. The specification does not teach or suggest actual embodiments, which makes it difficult to decide embodiment techniques. Accordingly, there are demands for techniques for reliably deciding and combining TPC commands under the given conditions of the specification.

SUMMARY OF THE INVENTION

An object of the invention is to solve at least the above problems and/or disadvantages and to provide at least the advantages described hereinafter.

Embodiments of the present invention may provide a method for controlling power of radio links that can reliably decide and combine transmit power control commands from each radio link to control transmit power of a terminal in a soft handover.

Embodiments may provide a method for controlling power of radio links that includes deciding reliability of transmit power control commands from different radio link sets. Embodiments may provide a method for combining the transmit power control command in a process for deciding the transmit power control commands from each radio link set to control transmit power of a terminal in a soft handover.

Power of radio links may be controlled by checking reliability of each radio link and confirming a quality of each radio link before combining the transmit power control commands in order to prevent reliability of the transmit power control commands from being reduced due to low quality of a common pilot channel.

Control of the power of radio links may include setting transmit power control command values of each radio link by comparing a quality of each radio link with a threshold value; and setting a combined transmit power control command value by deciding whether the set transmit power control command values are identical for all of the radio links.

The quality of each radio link may be represented by Eb/No, which is a signal to interference ratio. When the Eb/No is greater than the threshold value, then the transmit power control commands of each radio link are 1. When the Eb/No is smaller than the threshold value, then the transmit power control commands of each radio link is 0. The threshold value may be a preset reference value for estimating quality.

The method for controlling power of the radio links may further include repeating the procedure until reliability of the radio links of the whole radio link set is decided.

When reliability of the radio links of the whole radio link set is 1, the combined transmit power control command may be set to be 1. When reliability of any radio link of the radio link set is 0, the combined transmit power control command may be set to 0.

The foregoing and other objects, features, aspects, advantages and embodiments of the present invention will become more apparent from the following detailed description of the present invention when taken in conjunction with the accompanying drawings. Additional advantages, objects, and features of the invention will be set forth in part in the description that follows and in part will become apparent to those having ordinary skill in the art upon examination of the following or may be learned from practice of the invention.

BRIEF DESCRIPTION OF THE DRAWINGS

The following represents brief descriptions of the drawings in which like reference numerals refer to like elements and wherein.

DETAILED DESCRIPTION OF PREFERRED EMBODIMENTS

In the accompanying drawings, well-known functions or constructions may not be described in detail since they may obscure the invention in unnecessary detail.

The following process for processing TPC commands from different radio link sets includes a process for deciding the TPC commands in transmit power control of a terminal in soft handover having conditions discussed in 5.1.2.2.2 and 5.1.2.2.3 of the 3GPP TS 25.214 V3.7.0(2001-06), for example. Embodiments of the present invention may provide a method for deciding reliability of TPC commands from each radio link set and for combining the TPC commands.

Figure 3:
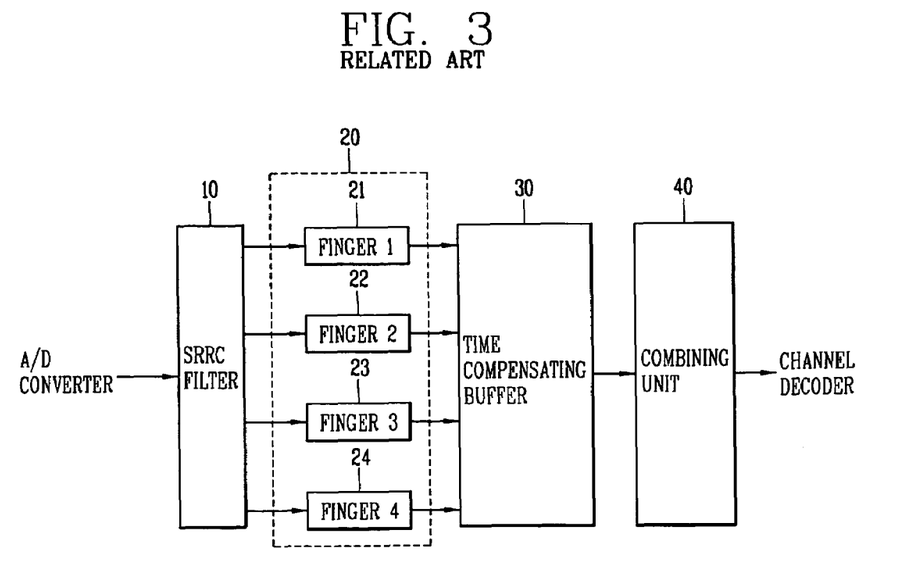
FIG. 3 is a block diagram illustrating a rake receiver according to an example embodiment of the present invention.

FIG. 3 is a block diagram illustrating a rake receiver according to an example embodiment of the present invention. Other embodiments and configurations are also within the scope of the present invention. FIG. 3 shows that the rake receiver includes a square root raised cosine (SRRC) filter 10, a finger 20, a time compensating buffer 30 and a combining unit 40. The SRRC filter 10 receives a signal from an A/D converter, and the SRRC filter 10 filters the signal. Therefore, the SRRC filter 10 detects the signal without symbol interferences.

The finger 20 may include a plurality of fingers 21 to 24. The finger 20 separates signals inputted through multiple paths according to the output of the SRRC filter 10, and demodulates the signals by paths. Accordingly, each of the fingers 21 to 24 includes a tracking loop, a data demodulator, a frequency error tracking circuit, a signal size regulating circuit and related control circuits. In addition, the fingers 21 to 24 track a common pilot channel (CPICH) of each radio link.

The time compensating buffer 30 outputs the outputs from the finger 20 by controlling time differences. That is, the time compensating buffer 30 is provided to every output to control time differences of the tracking result outputs from the fingers 21 to 24. The combining unit 40 combines the outputs from the time compensating buffer 30, and outputs the combined value to a channel decoder.

The signal passing through multiple path fading channels is regarded as a combination of elements of paths having different amplitude and phase. The rake receiver may maintain the multiple path power elements as much as possible, form the plurality of fingers in parallel (as shown in FIG. 3) to collectively demodulate the elements, and transmit the output through the combining unit 40.

Figure 4:
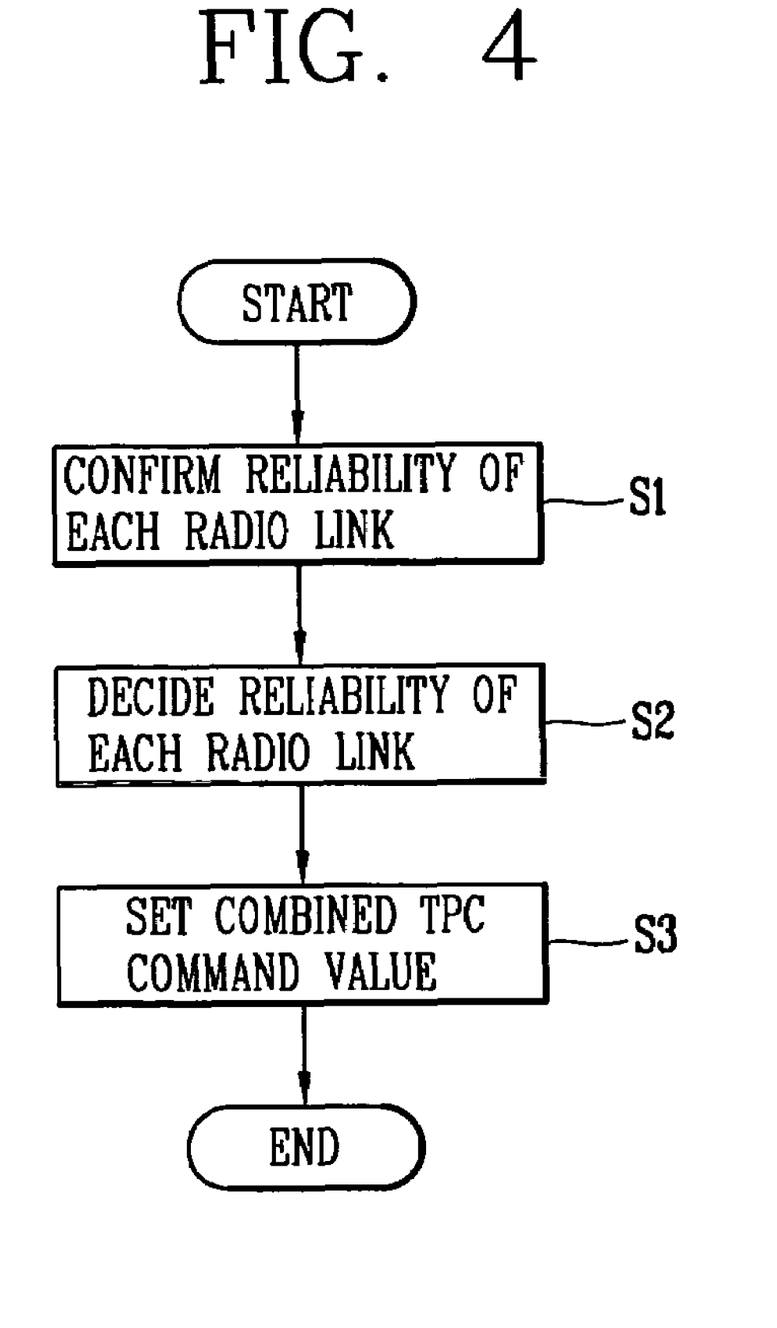
FIG. 4 is a flowchart showing a method for controlling power of radio links according to an example embodiment of the present invention.

FIG. 4 is a flowchart showing operations of a method for controlling power of radio links according to an example embodiment of the present invention. Other operations, orders of operation and embodiments are also within the scope of the present invention.

In controlling the power of the radio links, a reliability of each radio link is confirmed based on quality (S1). The reliability may be confirmed by checking the quality of each radio link (i.e., a signal to interference ratio) and comparing the ratio with a preset reference value. The reliability of each radio link may be decided according to the decision result of S1 (S2). The decided reliability of each radio link is set to be 0 or 1, for example.

When the process for confirming and deciding reliability of the whole radio links is finished, a combined TPC command value may be set according to the result (S3). That is, the combined TPC command of the power control commands from each radio link may be used to control the transmit power of the terminal.

Figure 5:
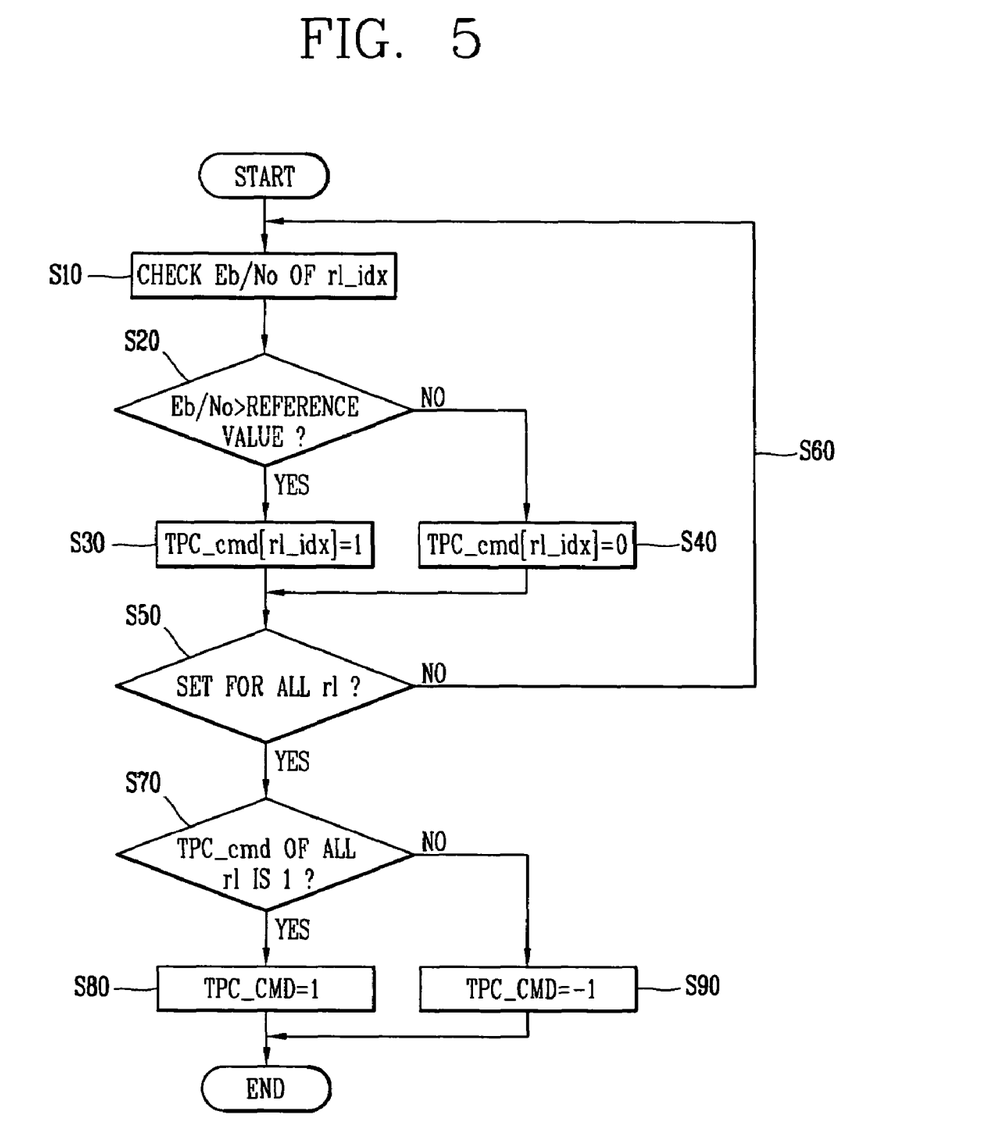
FIG. 5 is a flowchart showing a method for combining TPC commands from radio links according to an example embodiment of the present invention.

FIG. 5 is a flowchart showing operations of a method for combining TPC commands from radio links according to an example embodiment of the present invention. Other operations, orders of operation and embodiments are also within the scope of the present invention.

The method for combining the TPC commands may include a first process (S10~S60) for checking a quality of each radio link rl_idx in each finger, comparing the checked quality with a preset threshold value, and deciding the TPC command values of each radio link, and a second process (S70~S90) for confirming whether the TPC command values of each radio link is 1, and deciding a combined TPC command value TPC_cmd.

As shown in FIG. 5, in the first process, the quality of each radio link is measured (S10). The measured quality of each radio link is compared with a preset threshold value (S20). When the quality of a radio link is greater than the threshold value, the reliability of each radio link is set to be 1 (S30). Conversely, when quality of a radio link is not greater than the threshold value, the reliability of each radio link is set to be 0 (S40).

Thereafter, it is confirmed whether the measurement of the quality of all the radio links is finished (S50). If the measurement is finished, the routine goes to the second process. If the measurement is not finished, the routine proceeds back to the first process for measuring the quality of each radio link (S60).

In the second process, it is confirmed whether the reliability of each radio link obtained in the first process is 1 (S70). When the reliability of each radio link is 1, the combined TPC command value is set to be 1 (S80). However, when the reliability of any of the radio links obtained in the first process is not 1, then the combined TPC command value is set to be −1 (S90).

The method for combining the TPC commands from the radio links in the mobile communication system in accordance with an example embodiment of the present invention will now be described in more detail.

The plurality of fingers may check the quality of each radio link according to the signals inputted from the A/D converter and filtered by the SRRC filter before combining the TPC commands. This may confirm the reliability of each radio link. The Eb/No (or a signal to interference ratio (SIR)) may be measured to show the quality of each radio link, output from the finger so as to track the CPICH of each radio link (S10). The measured Eb/No may be compared with the preset threshold value. The threshold value may be a reference value for distinguishing high quality radio links from low quality radio links. When the channel status is good, if the SIR is high, the radio links of the corresponding channel are high quality radio links having less interference. On the other hand, if the SIR is low, the radio links of the corresponding channel are low quality radio links having more interference. In this process, the quality of each radio link can be discriminated (S20).

When the Eb/No is greater than the threshold value, the reliability of each radio link becomes 1. That is, when the value of the CPICH of the radio link received in the terminal is greater than the threshold value and the channel status is good (e.g., reliable), the radio link is deemed to have high quality and the demodulated TPC command is used (S30).

Conversely, when the Eb/No is smaller than the threshold value, the reliability of each radio link becomes 0. That is, when the value of the CPICH of the radio link received in the terminal is smaller than the threshold value and the channel status is good, the radio link is deemed to have low quality and the TPC command is replaced by a preset value (S40).

It is determined whether the checking of the quality of all the radio links is finished (S50). The following operations may decide the TPC commands according to the quality checked results of all the radio links. If checking of the quality of all the radio links is not finished, the routine feeds back to the first operation to repeat the first process (S10~S60) until checking of the quality of all the radio links is finished (S60). If checking of the quality of all the radio links is finished, it is confirmed whether reliability of each radio link, (i.e., the TPC commands from each radio link is 1) (S70). If reliability of any of the radio links is 0, (i.e., if any of the TPC commands from the radio links is 0), the combined TPC command is set to be −1 (S90). However, if the reliability of all the radio links is 1, the combined TPC command is set to be 1 (S80).

Setting the combined TPC command as 1 implies that the current transmit power of the terminal must be increased by unit power size. Setting the combined TPC command as −1 implies that the current transmit power of the terminal must be decreased by unit power size.

The transmit power of the terminal may be represented by following formula:

$$\text{Transmit power}_N = \text{transmit power}_{N-1} + (\text{TPC\_cmd} * \text{unit power size})$$

The transmit power may be changed by unit power size, such as 1 dBm, for example. If the combined TPC command has a value of 1, the transmit power increases by 1 dBm. If the combined TPC command has a value of −1, the transmit power decreases by 1 dBm. As a result, the uplink power control for controlling the transmit power of the terminal may be adjusted based on the TPC commands controlled by reliability.

Embodiments of the present invention may be provided within a mobile communication device having a processor device and a transmitting/receiving device. The processor device may perform the various operations discussed above including determining a reliability of each of a plurality of radio links based on quality of each of the links and setting a transmit power control value based on the determined reliability of each radio link. A transmitting device may transmit signals based on the set transmit power control value.

Embodiments of the present invention may provide a method for controlling power of the radio links by controlling the transmit power of the terminal according to reliability of the TPC commands. The transmit power is changed in proportion to reliability. The unit power size can be freely set or restricted.

The method for controlling power of the radio links may reliably decide and combine the TPC commands from the radio links of different radio link sets to control the transmit power of the terminal in a soft handover, thereby properly controlling power of the radio links.

The method for controlling power of the radio links may involve confirming quality of each radio link before combining the TPC commands, and checking reliability of each radio link based on the quality checking results to prevent reliability of the TPC commands from being reduced due to low quality of the CPICH.

Furthermore, the method for controlling power of the radio links may suggest realistic embodiments of the method for combining the TPC commands whose conditions have been theoretically defined, and facilitates technical developments of the method for combining the TPC commands in the soft handover.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A method for controlling power of radio links comprising:
    determining reliability of a plurality of radio links according to a quality of each radio link, the quality of each radio link being determined based on a signal to interference ratio (Eb/No); and
    setting a combined transmit power control command value based on the determined reliability of each of the plurality of radio links;
    wherein determining the reliability comprises:
    measuring the quality of each of the plurality of radio links; and
    comparing the measured quality of each radio link with a predetermined reference value,
    wherein when the quality of one radio link is greater than the reference value, determining the reliability includes setting the reliability of the one radio link to 1.

2. The method of claim 1, wherein when the quality of one radio link is smaller than the reference value, determining the reliability includes setting the reliability of the one radio link to 0.

3. The method of claim 1, wherein the reliability of each radio link may be represented as a transmit power control command value (TPC_cmd[rl_idx]) of each radio link.

4. The method of claim 1, wherein determining the reliability of each radio link is repeated until the reliability of all the radio links is decided.

5. The method of claim 1, wherein when the reliability of the radio links is 1, setting the combined transmit power control command value includes setting the combined transmit power control command value as 1.

6. The method of claim 5, further comprising increasing a transmit power based on the set combined transmit power control command value.

7. The method of claim 1, wherein when the reliability of the radio links is 0, setting the combined transmit power control command value includes setting the combined transmit power control command value as −1.

8. The method of claim 7, further comprising increasing a transmit power based on the set combined transmit power control command value.

9. A method for controlling power of radio links in a mobile communication system comprising:
    measuring a quality of a radio link, the quality of each radio link being determined based on a signal to interference ratio (Eb/No);
    setting a reliability of the radio link based on the measured quality of the radio link;
    repeating measuring the quality of the radio link and setting the reliability of the radio link until the reliability of all the radio links ate set; and
    determining a combined transmit power control command value based on the reliability of each radio link.

10. The method of claim 9, wherein the reliability of each radio link corresponds to a transmit power control command value of each radio link.

11. The method of claim 9, wherein setting the reliability of each radio link comprises:
    comparing the measured quality of the radio link with a predetermined reference value; and
    setting the reliability of each radio link based on the comparison.

12. The method of claim 11, wherein when the quality of each radio link is greater than the reference value, the reliability of each radio link is 1.

13. The method of claim 11, wherein when the quality of each radio link is smaller than the reference value, the reliability of each radio link is 0.

14. The method of claim 9, wherein when the reliability of all the radio links is 1, die combined transmit power control command value is determined to be 1.

15. The method of claim 14, further comprising increasing a transmit power based on the determined combined transmit power control command value.

16. The method of claim 9, wherein when the reliability of any of the radio links is 0, the combined transmit power control command value is determined to be −1.

17. The method of claim 16, further comprising decreasing a transmit power based on the determined transmit power control command value.

18. A mobile communication system comprising:
    a processor device to determine a reliability of each of a plurality of radio links based on quality of each of the links and to set a transmit power control value based on the determined reliability of each radio link, the processor device determining the quality of each radio link based on a signal to interference ratio (Eb/No); and
    a transmitting device to transmit signals based on the set transmit power control value;
    wherein the processor device determines the reliability by measuring the quality of each radio link and comparing the measured quality of each radio link with a predetermined reference value;

wherein when the quality of one radio link is greater than the reference value, the processor device sets the reliability of the one radio link to 1.

19. The mobile communication device of claim 18, wherein when the quality of one radio link is smaller than the reference value, the processor device sets the reliability of the one radio link to 0.

20. The mobile communication device of claim 18, wherein the processor device repeats determining the reliability of each radio link until the reliability of the radio links of all the radio links is decided.

21. The mobile communication device of claim 18, wherein when the reliability of the radio links is 1, the processor device sets the combined transmit power control command value as 1.

22. The mobile communication device of claim 21, wherein the processor device increases a transmit power of the transmitting device based on the set transmit power control value.

23. The mobile communication device of claim 18, wherein when the reliability of the radio links is 0, the processor device sets the combined transmit power control command value as −1.

24. The mobile communication device of claim 23, wherein the processor device decreases a transmit power of the transmitting device based on the set transmit power control value.

* * * * *